(12) United States Patent
Chatterjee et al.

(10) Patent No.: US 7,721,044 B1
(45) Date of Patent: May 18, 2010

(54) EXPANDING THE STORAGE CAPACITY OF A VIRTUALIZED DATA STORAGE SYSTEM

(75) Inventors: Paresh Chatterjee, Fremont, CA (US); Narayanan Balakrishnan, Milpitas, CA (US); Ajit Narayanan, Fremont, CA (US); Vijayarankan Muthirisavenugopal, Chennai (IN)

(73) Assignee: American Megatrends, Inc., Norcross, GA (US)

( * ) Notice: Subject to any disclaimer, the term of this patent is extended or adjusted under 35 U.S.C. 154(b) by 490 days.

(21) Appl. No.: 11/551,274

(22) Filed: Oct. 20, 2006

Related U.S. Application Data

(60) Provisional application No. 60/728,680, filed on Oct. 20, 2005.

(51) Int. Cl.
G06F 12/00 (2006.01)
G06F 11/00 (2006.01)
G06F 17/30 (2006.01)
G06F 15/167 (2006.01)
G06F 15/177 (2006.01)

(52) U.S. Cl. .................... 711/114; 711/112; 711/154; 711/170; 711/173; 711/162; 714/6; 714/7; 714/E11.088; 707/204; 709/212; 709/221

(58) Field of Classification Search ............... 711/114, 711/202, 203, 112, 154, 162, 165, 170, 173; 714/6, 7, E11.088; 707/204; 709/212, 221
See application file for complete search history.

(56) References Cited

U.S. PATENT DOCUMENTS

| | | |
|---|---|---|
| 4,942,579 A | 7/1990 | Goodlander et al. |
| 5,257,367 A | 10/1993 | Goodlander et al. |
| 5,720,027 A | 2/1998 | Sarkozy et al. |
| 5,732,238 A | 3/1998 | Sarkozy |

(Continued)

OTHER PUBLICATIONS

U.S. Appl. No. 11/417,801, filed May 4, 2006, entitled "Method, System, and Apparatus for Expanding Storage Capacity in a Data Storage System", Inventors: Chatterjee et al.

(Continued)

*Primary Examiner*—Christian P Chace
*Assistant Examiner*—Mehdi Namazi
(74) *Attorney, Agent, or Firm*—Hope Baldauff Hartman, LLC

(57) ABSTRACT

A system, method, apparatus, and computer-readable medium are provided for expanding the data storage capacity of a virtualized storage system, such as a storage cluster. According to one method, maps are generated and stored that define a stripe pattern for storing data on the storage nodes of a storage cluster. The stripe pattern for each map is defined such that when a storage node is added to a cluster and the data is re-striped according to the new map, only the data that will subsequently reside in the new storage node is moved to the new storage cluster during re-striping. The stripe pattern may be further defined so that during re-striping no movement of data occurs between two storage nodes that existed in the cluster prior to the addition of the new storage node. The stripe pattern may be further defined such that during re-striping an equal amount of data is moved from each of the storage nodes that existed in the cluster prior to the addition of the new storage node to the new storage node.

9 Claims, 14 Drawing Sheets

U.S. PATENT DOCUMENTS

| | | | |
|---|---|---|---|
| 5,787,459 | A | 7/1998 | Stallmo et al. |
| 5,790,774 | A | 8/1998 | Sarkozy |
| 5,893,919 | A | 4/1999 | Sarkozy et al. |
| 5,974,426 | A | 10/1999 | Lee et al. |
| 6,098,128 | A | 8/2000 | Velez-McCaskey et al. |
| 6,327,638 | B1 | 12/2001 | Kirby |
| 6,484,235 | B1 | 11/2002 | Horst et al. |
| 6,502,166 | B1 * | 12/2002 | Cassidy ............ 711/114 |
| 6,718,436 | B2 | 4/2004 | Kim et al. |
| 6,901,479 | B2 | 5/2005 | Tomita |
| 7,366,837 | B2 * | 4/2008 | Corbett et al. ............ 711/114 |
| 7,437,507 | B2 * | 10/2008 | Sharma et al. ............ 711/114 |
| 7,536,529 | B1 | 5/2009 | Chatterjee et al. |
| 2002/0161983 | A1 | 10/2002 | Milos et al. |
| 2003/0163630 | A1 | 8/2003 | Aasheim et al. |
| 2005/0102551 | A1 * | 5/2005 | Watanabe ............ 714/5 |
| 2007/0011425 | A1 * | 1/2007 | Sicola ............ 711/165 |
| 2008/0109601 | A1 * | 5/2008 | Klemm et al. ............ 711/114 |

OTHER PUBLICATIONS

U.S. Appl. No. 11/254,347, filed Oct. 20, 2005, entitled "Method, System, Apparatus, And Computer-Readable Medium for Provisioning Space in a Data Storage System," Inventors: Chatterjee et al.

U.S. Official Action dated Sep. 4, 2007 in U.S. Appl. No. 11/254,347.

U.S. Official Action dated Mar. 18, 2008 in U.S. Appl. No. 11/254,347.

U.S. Official Action dated Oct. 8, 2008 in U.S. Appl. No. 11/254,347.

U.S. Notice of Allowance / Allowability dated Jan. 12, 2009 in U.S. Appl. No. 11/254,347.

U.S. Official Action dated Mar. 30, 2009 in U.S. Appl. No. 11/417,801.

U.S. Appl. No. 12/425,123, filed Apr. 16, 2009 entitled "Provisioning Space in a Data Storage System," Inventors: Chatterjee et al.

U.S. Official Action dated Jul. 8, 2009 in U.S. Appl. No. 11/417,801.

* cited by examiner

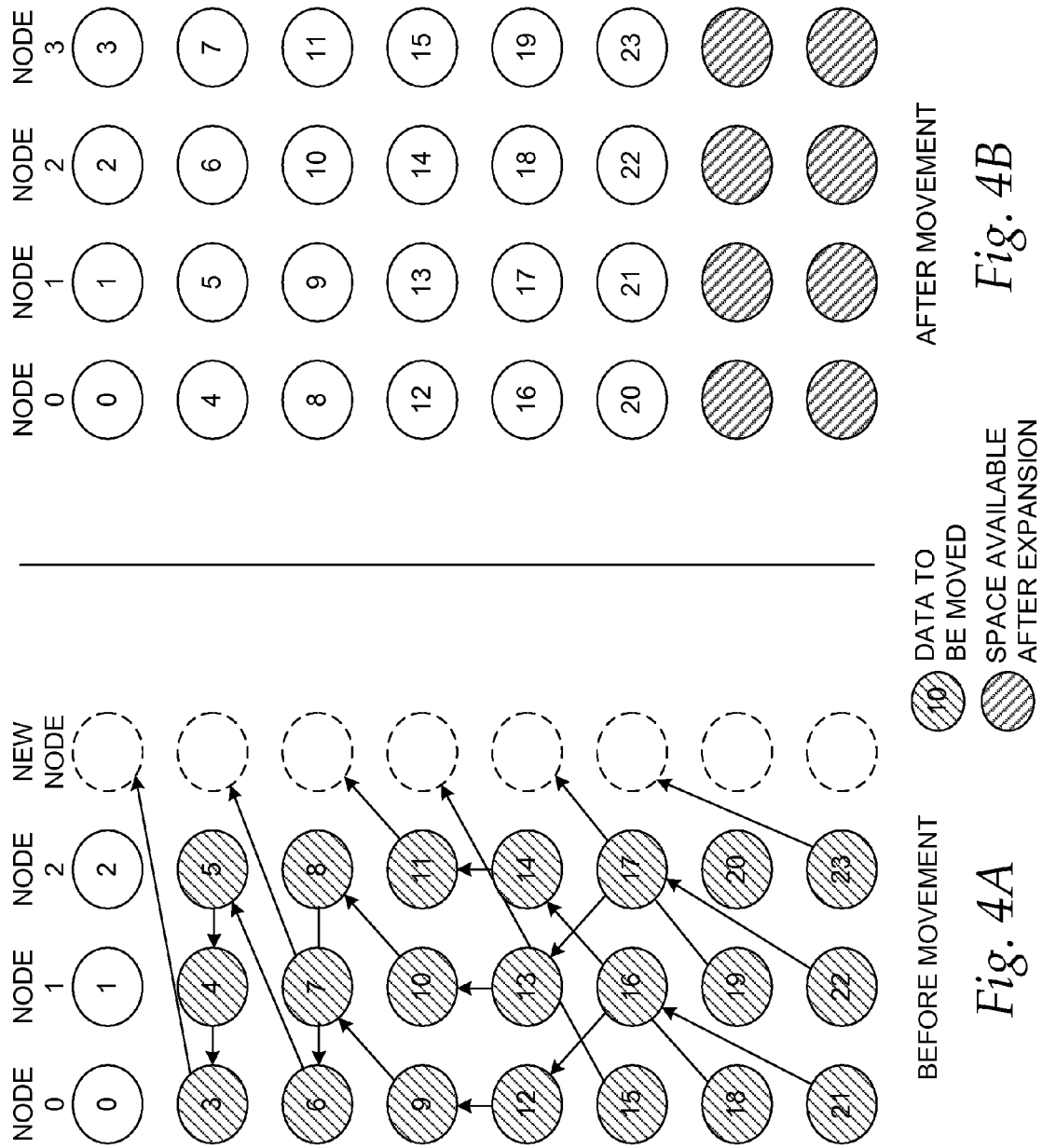

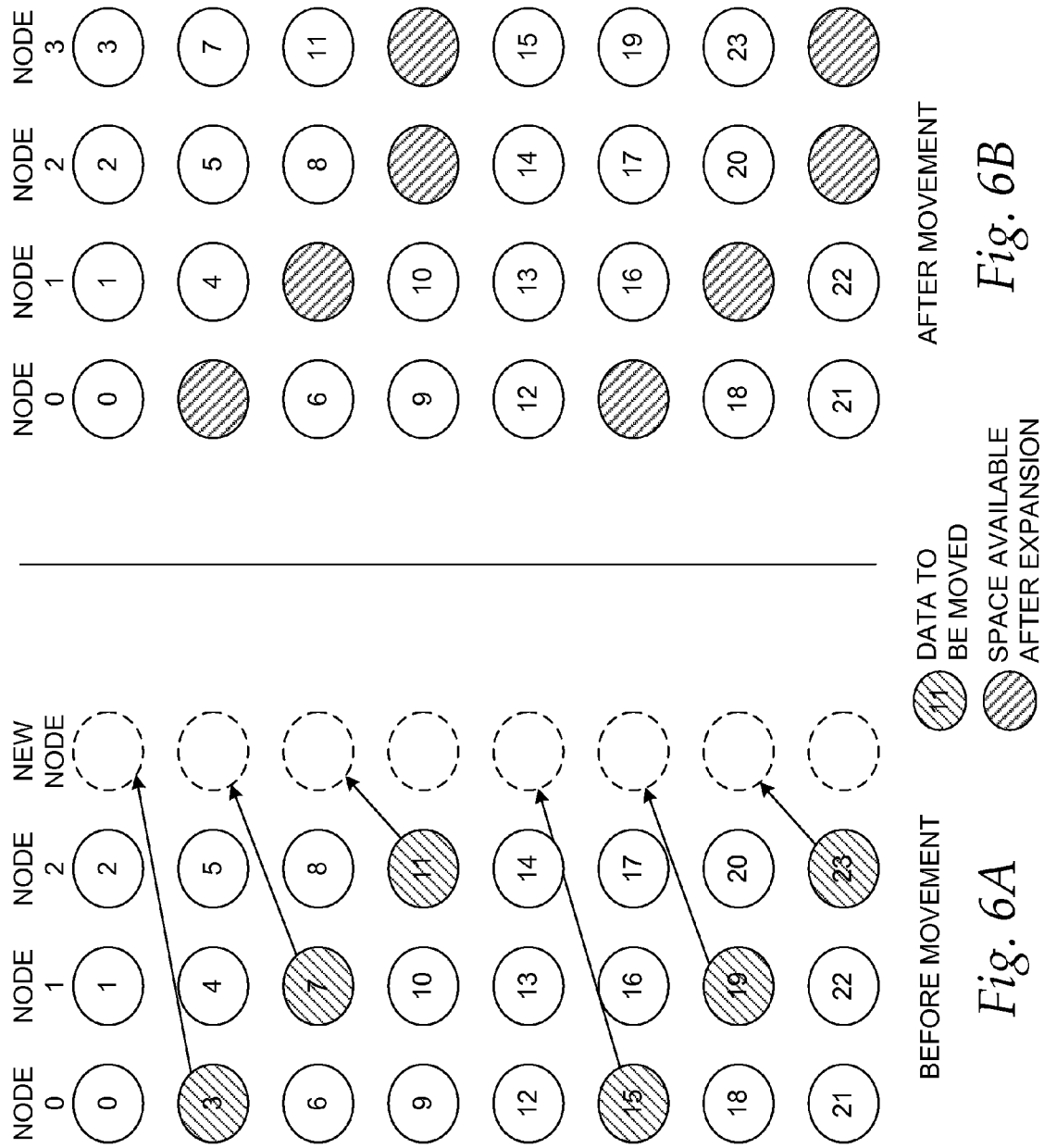

| | | | |
|---|---|---|---|
| (0) | 36 | (0) | 21 SEP 8:19 |
| (3) | 24 | ◇3 | 21 SEP 8:19 |
| (6) | 27 | (6) | 5 OCT 04:30 |
| (9) | 3 | (9) | 7 OCT 01:25 |
| (12) | 12 | (12) | (NEVER) |
| (15) | 6 | ◇15 | 23 SEP 19:33 |
| (18) | 0 | (18) | 7 OCT 01:25 |
| (21) | 45 | (21) | 5 OCT 04:30 |
| (24) | 30 | (24) | (NEVER) |
| (27) | 42 | ◇27 | 6 OCT 12:03 |
| (30) | 33 | (30) | 5 OCT 04:30 |
| (33) | 21 | (33) | 21 SEP 8:19 |
| (36) | 18 | (36) | 21 SEP 8:19 |
| (39) | 39 | ◇39 | (NEVER) |
| (42) | 9 | (42) | 25 OCT 11:00 |
| (45) | 15 | (45) | 7 OCT 01:25 |
LBA ORDER OF MOVEMENT:
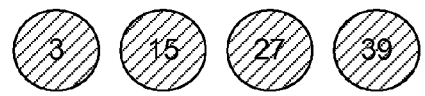
PHYSICAL ORDER OF MOVEMENT:
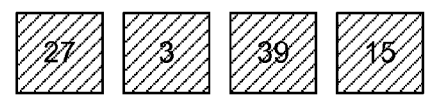
TEMPORAL ORDER OF MOVEMENT:
*Fig. 8*

EXPANDING THE STORAGE CAPACITY OF A VIRTUALIZED DATA STORAGE SYSTEM

CROSS-REFERENCE TO RELATED APPLICATIONS

This application claims the benefit of U.S. provisional patent application No. 60/728,680, filed on Oct. 20, 2005, and entitled "An Innovative Method of Expanding Storage Capacity in a Virtualized Storage System," which is expressly incorporated herein by reference in its entirety.

TECHNICAL FIELD

The disclosure provided herein relates generally to the field of storage systems consisting of multiple storage nodes and, more particularly, to the field of virtualized storage servers.

BACKGROUND

Scalability is an important requirement in all data storage systems. Different types of storage systems provide diverse methods of seamless scalability through capacity expansion. In some storage systems, such as systems utilizing redundant array of inexpensive disk ("RAID") controllers, it is often possible to add disk drives (or other types of mass storage devices) to a storage system while the system is in operation. In such a system, the RAID controller re-stripes existing data onto the new disk and makes the capacity of the other disks available for new input/output ("I/O") operations. This methodology, known as "vertical capacity expansion," is common. However, this methodology has at least one drawback in that it only scales data storage capacity, without improving other performance factors such as the processing power, main memory, or bandwidth of the system.

In other data storage systems, it is possible to add capacity by "virtualization." In this type of system, multiple storage servers are utilized to field I/O operations independently, but are exposed to the initiator of the I/O operation as a single device, called a "storage cluster." Each storage server in a cluster is called a "storage node" or just a "node." When data storage capacity becomes low, a new server may be added as a new node in the data storage system. In addition to contributing increased storage capacity, the new storage node contributes other computing resources to the system, leading to true scalability. This methodology is known as "horizontal capacity expansion." Some storage systems support vertical expansion of individual nodes, as well as horizontal expansion by the addition of storage nodes.

Systems implementing horizontal capacity expansion may choose to concatenate the capacity that is contributed by each node. However, in order to achieve the maximum benefit of horizontal capacity expansion, it is necessary to stripe data across the nodes in much the same way as data is striped across disks in RAID arrays. While striping data across nodes, the data should be stored in a manner that ensures that different I/O operations are fielded by different nodes, thereby utilizing all of the nodes simultaneously. It is also desirable not to split I/O operations between multiple nodes, so that the I/O latency is low. Striping the data in this manner provides a boost to random I/O performance without decreasing sequential I/O performance. The stripe size is calculated with this consideration, and is called the "zone size."

However, when data is striped across multiple nodes, the process of re-striping data when a new node is added is lengthy and inefficient in most contemporary storage systems. In particular, current storage systems require the movement of a massive amount of data in order to add a new node. As an example, in order to expand a four node cluster to a five node cluster using current data migration methodologies, only one in twenty zones remains on the same node and even those zones are in a different position on the node. Hence, the current process of migration is effectively a process of reading the entire body of data in the system according to its unexpanded configuration, and then writing it in its entirety according to expanded configuration of the cluster.

Such a migration process typically takes several days. During this time, the performance of the cluster is drastically decreased due to the presence of these extra migration I/O operations. A complicated method of locking is also required to prevent data corruption during the data migration process. The storage capacity and processing resources of the newly added node also do not contribute to the cluster until the entire migration process has completed; if an administrator is expanding the node in order to mitigate an impending capacity crunch, there is a good likelihood that the existing capacity will be exceeded before the migration completes. In all cases, the migration process is cumbersome, disruptive and tedious.

It is with respect to these considerations and others that the present invention has been made.

SUMMARY

A system, method, apparatus, and computer-readable medium are provided for expanding the data storage capacity of a virtualized storage system, such as a storage cluster. Through the embodiments described herein, when a new storage node is added to a storage cluster, data can be migrated to the new storage node in a manner that ensures that the minimum amount of data is moved. Additionally, the capacity of the newly added storage node can be made available immediately after the node is added. Moreover, during the migration process, only small areas need to be locked, thereby improving availability of the storage cluster during the migration process.

According to one method provided herein, maps are generated and stored that define a stripe pattern for storing data on the storage nodes of a storage cluster. Each map corresponds to a cluster having a certain number of nodes. For instance, unique maps may be generated and stored for storage clusters having three nodes, four nodes, five nodes, and so on. An appropriate map is selected based on the number of nodes in the cluster and data is striped on the nodes according to the selected map. When a storage node is added to the cluster, a new map is selected based on the configuration of the cluster after the new storage node has been added. The data on the cluster is then re-striped across all of the storage nodes, including the newly added node, according to the new map.

According to one aspect, the stripe pattern for each map is defined such that when a storage node is added to a cluster and the data is re-striped according to the new map, only the data that will subsequently reside in the new storage node is moved to the new storage cluster during re-striping. The stripe pattern may be further defined so that during re-striping no movement of data occurs between two storage nodes that existed in the cluster prior to the addition of the new storage node. Additionally, the stripe pattern may be further defined such that during re-striping an equal amount of data is moved from each of the storage nodes that existed in the cluster prior to the addition of the new storage node to the new storage node.

According to other aspects of the method, the data migration process does not reorganize data within a storage node even if the stripe pattern may mandate such a reorganization.

This is achieved by thin-provisioning the storage nodes, maintaining a map of how logical addresses are mapped to physical addresses for each storage node. In this manner, the number of I/O operations that are performed during migration are reduced, and the migration time is correspondingly lower.

According to other aspects of the method, data on the storage nodes is divided into storage zones. In order to re-stripe the data on the cluster according to a new map, the storage zones to be moved to the new storage node are identified based upon the maps. Once the storage zones have been identified, the storage zones are moved individually to the new storage zone. The storage zones may be moved to the new storage node in physical order, logical order, or in the order that the storage zones were most recently accessed. Each storage zone is locked while it is being moved. Once the storage zone has been moved, the new storage node can immediately begin fielding I/O operations for the newly moved storage zone. Additionally, the space freed by the movement of the storage zone to the new storage node can be immediately made available for storage.

According to other aspects of the method, the capacity of the newly added storage node may be made available immediately by storing data for write operations intended for existing storage nodes on the newly added node. At a subsequent time, the data can be moved from its location on the new storage node to its originally intended location on the pre-existing storage node. In this manner, capacity can be made available immediately after the addition of the new storage node without waiting for the re-striping process to complete.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 4A-4B are data diagrams that illustrate one method for migrating data from a three node storage cluster to a four node storage cluster;

FIGS. 6A-6B are data diagrams that illustrate another method for migrating data from a three node storage cluster to a four node storage cluster;

FIG. 8 is a data diagram that illustrates various options of choosing the movement order of data between nodes and their effects in boosting performance;

DETAILED DESCRIPTION

Figure 1:
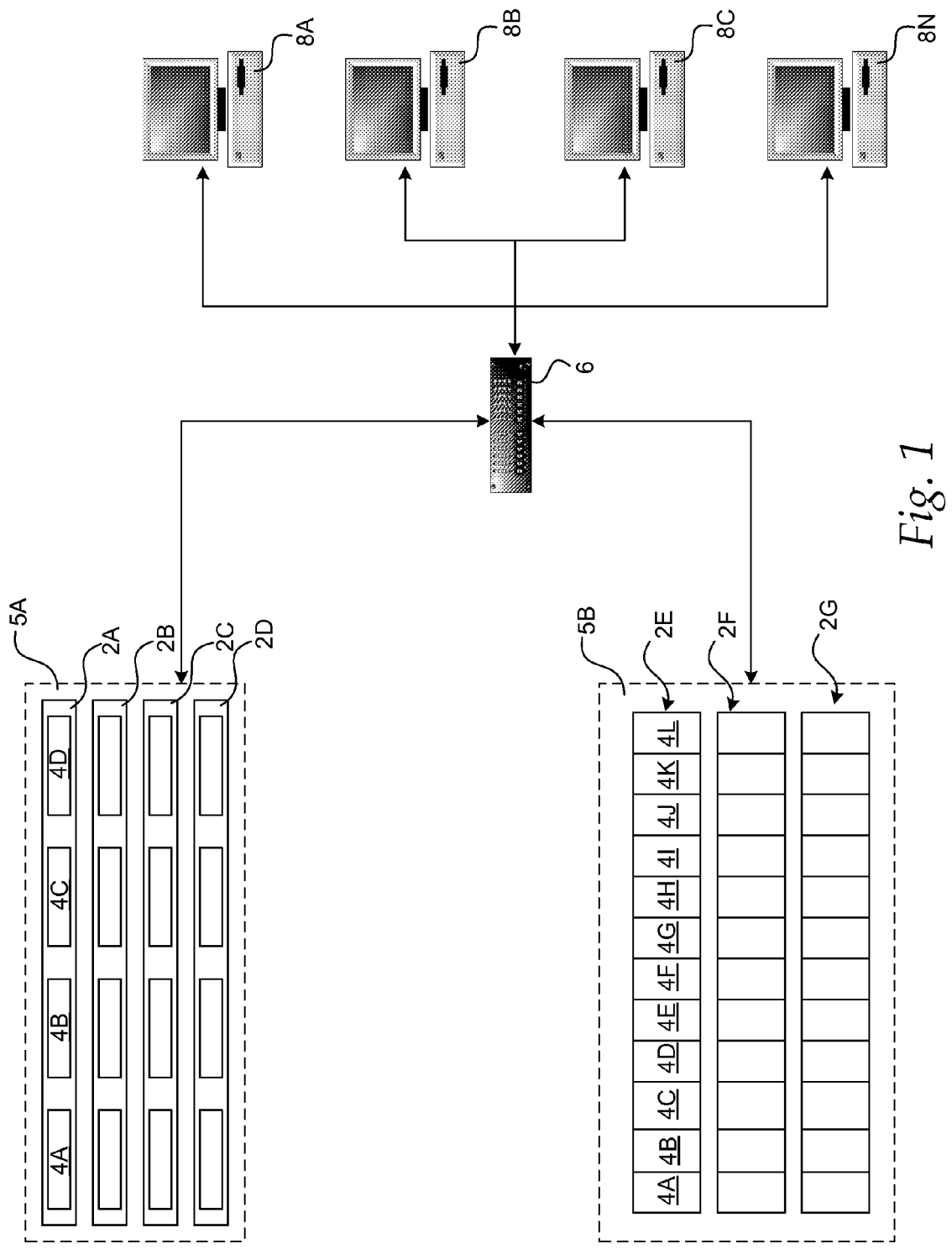
FIG. 1 is a computer architecture and network diagram showing aspects of a computer network and a storage server computer described herein.

In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
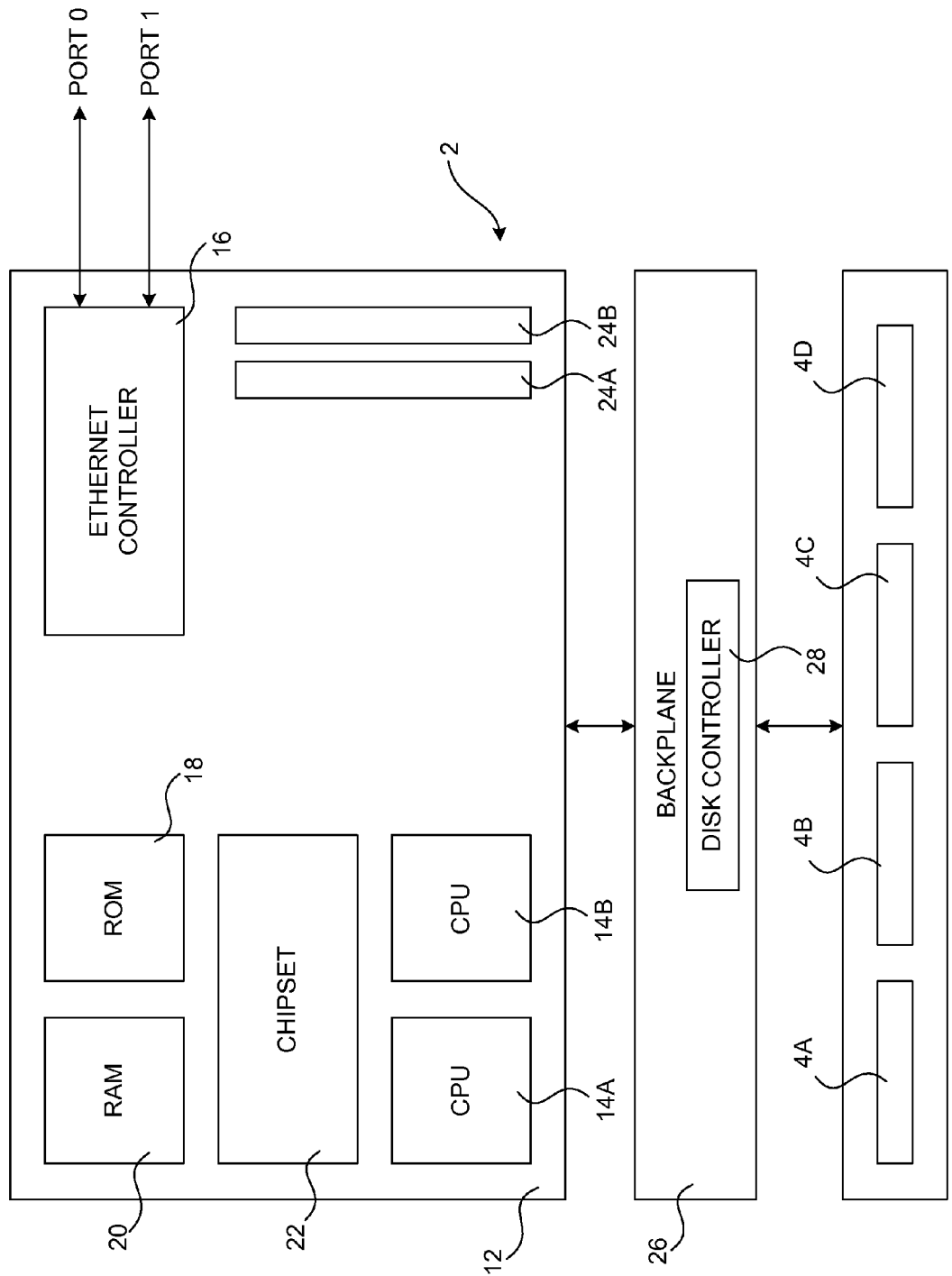
FIG. 2 is a computer architecture diagram illustrating aspects of a storage server computer described herein.
Figure 3:
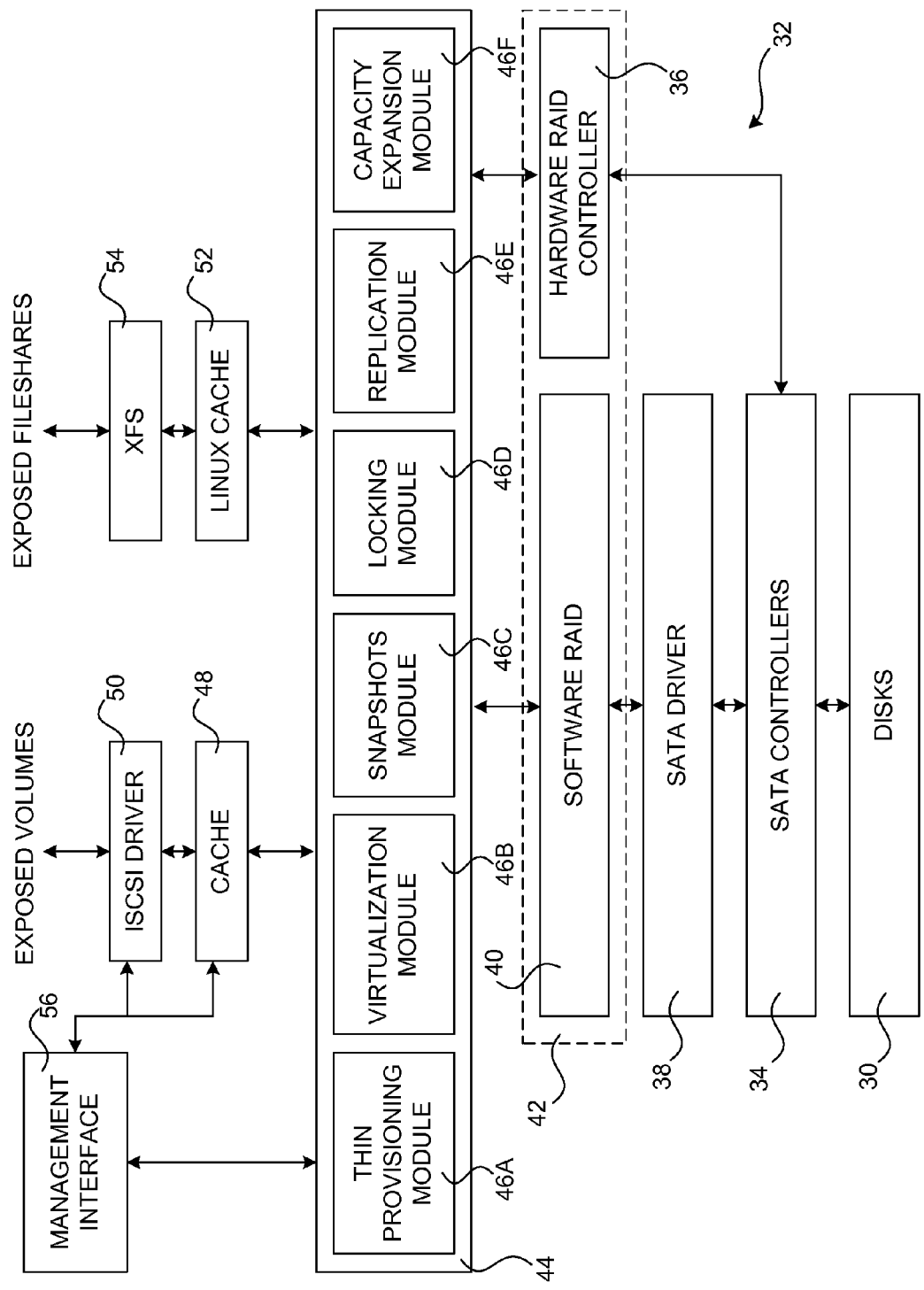
FIG. 3 is a software architecture diagram illustrating various aspects of a storage stack utilized by a storage server described herein.

FIGS. 1-3 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules.

Referring now to FIG. 1, an illustrative operating environment for the various implementations described herein will be disclosed. As shown in FIG. 1, the embodiments presented herein may be implemented in the storage server computers 2A-2G (also referred to herein as "storage nodes" or a "node") that are operative to read and write data to one or more mass storage devices, such as hard disk drives. According to implementations, the storage server computers may be housed in a one rack space unit storing up to four hard disk drives. For instance, the node 2A includes the hard disk drives 4A-4D. Alternatively, each node may be housed in a three rack space unit storing up to fifteen hard disk drives. For instance, the node 2E includes the hard disk drives 4A-4L. Other types of enclosures may also be utilized that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes.

When data storage capacity becomes low on a storage cluster, additional capacity may be added to the cluster through the addition of a new storage node to the cluster or by adding additional mass storage devices to an existing storage node in the cluster. As discussed briefly above, the addition of a new storage node to a cluster not only increases the storage capacity of the cluster, but also contributes other computing resources to the system, leading to true scalability. This methodology is known as "horizontal capacity expansion." The implementations described herein are primarily concerned with the addition of storage capacity to a storage cluster through the addition of a new storage node.

In order to achieve the maximum benefit of horizontal capacity expansion, data is striped across the nodes of each storage cluster. For instance, the cluster 5A may stripe data across the storage nodes 2A, 2B, 2C, and 2D. The cluster 5B may stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance. In particular, striping is most commonly done by dividing the storage capacity of each node into storage "zones," and by placing all zones with the same remainder when divided by the number of nodes, into the same node. For example, in a four node cluster such as the cluster 5A, zones 0, 4, 8, 12, 16, etc. are stored in node 0; zones 1, 5, 9, 13, 17 etc. are stored in node 1; zones 2, 6, 10, 14, 18 etc. are stored in node 2; and zones 3, 7, 11, 15, 19 etc. are stored in node 3.

When a new node is added to a striped storage cluster, the existing data must be re-striped across all of the nodes, including the new node. This process of re-striping the data when a new node is added is often lengthy and inefficient in most contemporary storage systems. Accordingly, the methodologies provided herein allow for improved performance when re-striping data across multiple nodes in response to the addition of a new node to a storage cluster.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part.

The network switch 6 is connected to one or more client computers 8A-8N (also referred to herein as "initiators"). It should be appreciated that other types of networking topologies may be utilized to interconnect the clients and the storage server. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Turning now to FIG. 2, an illustrative computer hardware architecture for practicing the various embodiments of the invention will now be described. In particular, FIG. 2 shows an illustrative computer architecture and implementation for each storage node 2. In particular, each storage server computer 2 includes a baseboard 12, or "motherboard", which is a printed circuit board to which a multitude of components or devices may be connected by way of a system bus or other electrical communication path. In one illustrative embodiment, these components include, without limitation, one or more central processing units ("CPU") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include local area network LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments of the invention will now be described. In particular, FIG. 3 illustrates a storage stack 32 utilized in the embodiments of the invention. At the top of the storage stack 32, storage volumes or fileshares are exposed to the initiators 8A-8N. At the bottom of the storage stack 32 are the actual mass storage devices, such as the disks 4A-4D, that are utilized to store the data. The mass storage devices are, in turn, connected to a disk controller, such as a Serial ATA ("SATA") controller 34 or a hardware RAID controller 36. In the case of a SATA controller, a SATA driver 38 may be utilized to access the hardware device. Additionally, a software RAID module 42 may also be utilized to provide RAID services in the absence of a hardware RAID controller 36. A unified RAID management layer 42 may be utilized to simplify the utilization of RAID with either software or hardware implementations.

Above the unified RAID management layer 42 sits a kernel module 44 that implements the functions described herein. In particular, the kernel module 44 may provide functionality for implementing thin provisioning, virtualization, snapshots, locking, replication, and capacity expansion. These features are implemented by the modules 46A-46F, respectively, and are described in greater detail herein. In particular, the thin provisioning module 46A provides the functionality described herein for allocating physical capacity to logical volumes on an as-needed basis and for provision tracking. The snapshots module 46C provides functionality for creating, utilizing, and managing point in time snapshots of the contents of logical storage volumes. The replication module 46E provides functionality for replication within the computer 2. The locking module 46D provides functionality for synchronizing input/output operations in a computer system that utilizes snapshots and thin provisioning. The virtualization module 46B provides functionality for clustering, governing the manner of zoning data amongst various nodes, and specifying how each I/O operations is routed to the node specified by the stripe maps. The capacity expansion module 46F is a related component to the virtualization module, and provides the functionality described herein for re-striping data across multiple nodes when a new node is added. Additional details regarding the operation of the capacity expansion module 46F are provided below.

Above the kernel module 44, a number of software components are utilized depending upon the access mechanism utilized to access the storage cluster of which the storage server computer 2 is a part. In particular, a Storage Area Network ("SAN") path is provided that utilizes a cache 48 and a Internet Small Computer Systems Interface ("iSCSI") driver 50. A Network Attached Storage ("NAS") path is also provided that utilizes a LINUX cache 52 and the XFS high-performance journaling file system 54. Volumes are exposed through the SAN path while fileshares are exposed through the NAS path.

It should be appreciated that the kernel module 44 comprises a LINUX-compatible mass storage device driver in embodiments of the invention. However, although the embodiments of the invention are described as being implemented within a LINUX-compatible device driver, the various aspects of the invention may be implemented at different points within the storage stack and in conjunction with other operating systems. For instance, the aspects of the invention may be implemented with the FREEBSD operating system or with the WINDOWS family of operating systems from MICROSOFT CORPORATION of Redmond, Wash.

According to embodiments of the invention, a management interface 56 may also be provided for controlling and monitoring the various aspects of the present invention. The management interface communicates with the various layers through software interfaces to retrieve performance data, provide configuration data, and to perform other functions.

Turning now to FIGS. 4A and 4B, a method of striping data in a three-node and a four-node system contemporary storage system, including 3-drive RAID-0 arrays, will be described. Utilizing this method, a modulo algorithm is utilized to stripe data across multiple nodes in a storage cluster. The node that a particular zone belongs to is determined by finding its modulo when divided by the number of nodes in the cluster. This striping schema has the benefit of distributing random writes on all the nodes in the cluster. It also has the benefit that sequential writes of size less than one zone are, to a large degree, fielded from one box. FIG. 4A illustrates how this method stripes zones across a three node cluster. Each of the circles in FIG. 4A represents a zone and the numbers within the circles represent the zone number. For instance, node 0 includes zones 0, 3, 6, 9, 12, 15, 18, and 21; node 1 includes zones 1, 4, 7, 10, 13, 16, 19, and 22; and node 2 includes zones numbered 2, 5, 8, 11, 14, 17, 20, and 23.

FIG. 4A also shows the amount of data that needs to be moved while migrating from a 3-box cluster to a 4-box cluster, such as when a new node, node 3, is added to the cluster. In particular, FIG. 4A shows the space available on the newly added node (represented by circles with dashed lines in FIG. 4A). FIG. 4A also includes arrows illustrating the movement of data necessary to re-stripe the cluster according to the module algorithm following the addition of the new node to the cluster. As is evident from FIG. 4A, using this algorithm almost all zones need to be moved. Free space is made available at the end of the nodes after the migration has completed; until such time, it is not possible to utilize additional storage capacity on the old drives. FIG. 4B shows the arrangement of the zones after the new node has been added to the cluster, with the free space available at the end of the nodes.

Some systems may employ provision tracking, which is a method of identifying which zones have been written to previously and which have not, and using this data to optimize migration by not moving data that was never written. However, the striping schema shown in FIGS. 4A-4B cannot fully take advantage of provision tracking. For example, if zone 10 had never been written to before expansion started, and a write to this zone arrives while expansion is on-going (for example, just after zone 5 has been moved). It is not possible to accommodate zone 10 in its new location since the new location is currently being occupied by zone 8; instead, zone 10 must be written at its old location and then migrated when its turn arrives during migration.

Figures 5A, 5B:
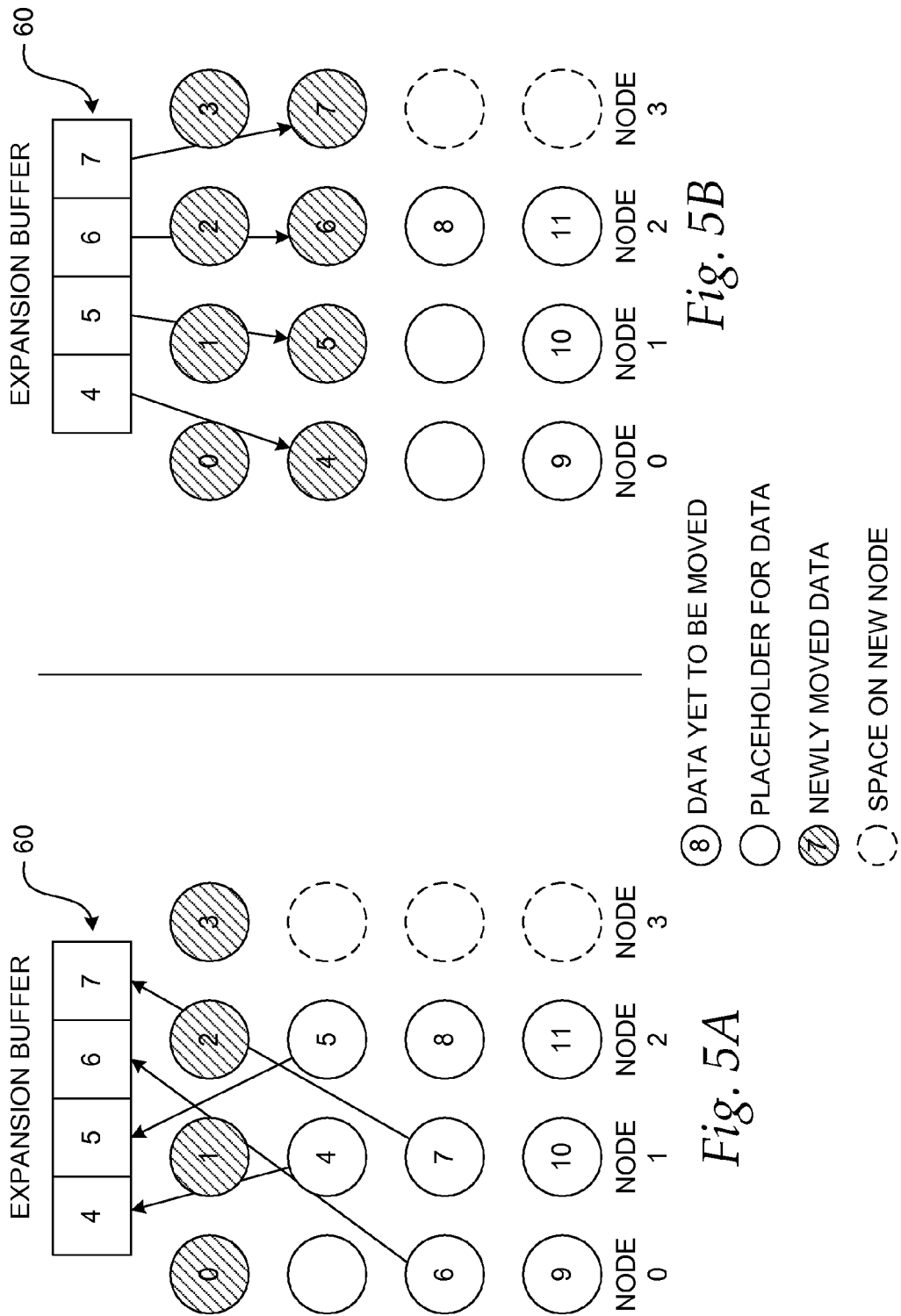
FIGS. 5A-5B are data diagrams that illustrate additional aspects of the method for migrating data from a three node storage cluster to a four node storage cluster illustrated in FIGS. 4A-4B.

FIGS. 5A and 5B illustrate the actual algorithm of expansion that is used in some contemporary systems. In particular, FIG. 5A shows how expansion of the zones 4, 5, 6 and 7 is done, assuming the expansion of zones 0, 1, 2 and 3 is complete. An expansion buffer 60 is utilized to store data read from these four zones. For instance, as shown in FIG. 5A, the data from zones 4-7 has been copied to the expansion buffer 60. The contents of the buffer 60 are subsequently written to the destination zones. This process is illustrated in FIG. 5B. All four zones need to be locked during the time that the data is read from the zones and written to the new locations.

It should be appreciated utilizing such a scheme for data migration as illustrated in FIGS. 4A-4B and 5A-5B, every single zone in the system must be read from and written to. This process can generate a crippling overhead of I/O operations. Additionally, on each node, the writes are always in a location that precedes the read; if each node was a disk-like storage device, this system would generate a very large amount of rotational latency. Consequently, the performance of the system is expected to drop by an order of magnitude during migration in such systems.

FIGS. 6A-6B illustrate a method of moving data when it is arranged according to an efficient Data Placement Algorithm ("DPA"), described herein. In general, the DPA is a sequence of maps that each defines a stripe pattern for storing data on the storage nodes. According to one implementation, the maps are generated and stored at the cluster. For instance, maps may be generated for a three node cluster, a four node cluster, a five node cluster, and so on. When a node is added to a cluster, a new map is identified based upon the number of nodes in the cluster following expansion, and the new map is utilized to re-stripe the data on the cluster.

The stripe pattern for each map is defined such that when a new storage node is added to the cluster, data is re-striped between the storage nodes according to the new map such that only the data that will subsequently reside in the new storage node is moved to the new storage node during re-striping. The stripe pattern for each map is further defined such that when the new storage node is added to the cluster and the cluster is re-striped according to the new map, no movement of data occurs between two storage nodes that existed in the storage cluster prior to the addition of the new storage node. Moreover, the stripe pattern for each map is further defined such that when the new storage node is added to the cluster, and the cluster is re-striped according to the new map, an equal amount of data is moved to the new storage node from each of the storage nodes that existed in the storage cluster prior to the addition of the new storage node. These properties of the maps will be explained in greater detail below.

FIG. 6A illustrates the striping of a three node cluster according to the DPA. FIG. 6A also shows the process of re-striping the data stored on a three node cluster to a four node cluster. The arrows in FIG. 6A illustrate the zones that need to be moved as a result of the addition of a new node to the three node cluster. It should be appreciate that the process of re-striping data from the three node cluster shown in FIG. 6A to the four node cluster shown in FIG. 6B involves only moving a preferably equal amount of data from each of the nodes 1 through 3 into node 4. There is no movement of data within the nodes that were in the cluster prior to expansion.

Figure 7B:
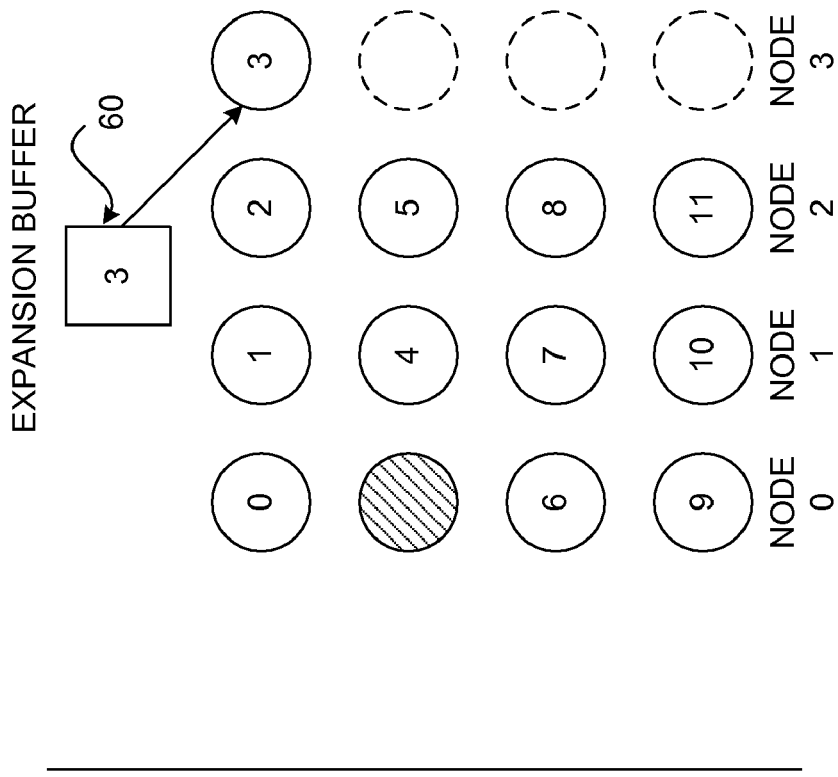
FIGS. 7A-7B are data diagrams that illustrate additional aspects of the method for migrating data from a three node storage cluster to a four node storage cluster illustrated in FIGS. 6A-6B.
Figure 7A:
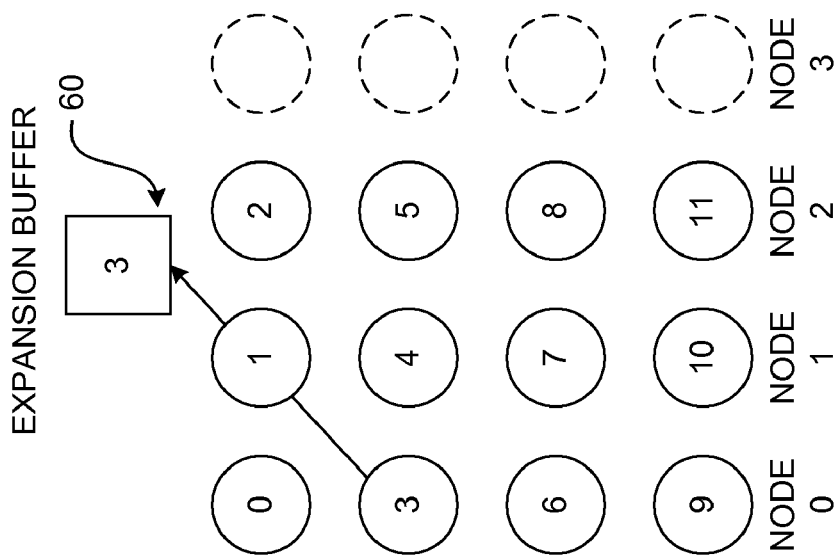

FIGS. 7A-7B illustrate this process further. In particular, FIGS. 7A-7B illustrate the process of re-striping a three-node cluster to a four-node cluster according to the DPA. As opposed to the algorithm described above with respect to FIGS. 5A-5B, the DPA algorithm performs far fewer reads and writes. Each zone that is to be moved is locked individually, and then read into the buffer 60. The buffer 60 is then written to the new node and the zone is unlocked. The space that was occupied by the old zone is immediately released, and may be used to host new operations.

The method in which the newly released zone in the old node may be used depends on the capabilities of each node in the storage cluster. If each node is thin provisioned, this space is released to a common pool from where it may be reallocated to any sector that needs it. This is the best way of utilizing space if the storage nodes are intelligent servers. Alternatively, if the storage nodes are single disks, or 'dumb' storage devices, the new space may now be used to store the next higher zone; in FIG. 6A, for example, if we assume the capacity of the system has expanded from 24 nodes to 32 nodes upon addition of the new node, the space previously occupied by zone 3 in the first node may now be used for housing zone 24, which was previously beyond the end of the last LBA of the system. Hence, capacity may be made available immediately to the storage system upon adding the new node.

If the system is thin-provisioned with provision tracking, further advantage is gained by employing this method of movement. For instance, referring to FIGS. 6A-6B, if data had never been written to zone 7, then zone 7 will not be transferred from the second node to the last node, since it contains only invalid data; only the ownership of zone 7 will change. However, if a subsequent write operation arrives at zone 7 after migration has started (but before migration has reached zone 7), it may be directly fielded by the new node without having to field it first in the old node and then migrate it to the new one. In a system that is thin provisioned, there will be several instances of this kind of I/O occurring and, as a result, the performance for such I/O operations (and therefore of the system as a whole) is substantially increased. The newly added node is also ready to field I/O operations to zones that have already been moved; therefore, it is able to contribute its computing resources to the cluster before the expansion has actually been completed.

Referring again to FIGS. 6A-6B, another benefit of the DPA method of arranging data is that the additional I/O load on the existing nodes is substantially reduced, even for the zones that are being transferred. First, the migrating zones are only read from the old nodes; all writes now take place only on the newly added node. Since the same disks do not have both read and write operations, the kind of latency that is experienced with traditionally striped data is not experienced here. Since the old nodes contain a majority of data in the cluster, such an optimization ensures that the busiest boxes are loaded as lightly as possible by the expansion process, thereby boosting performance.

FIG. 8 shows various ways of choosing the order of moving data after the zones that are to be moved have been chosen. As described above, the maps define which zones should be moved. Once the zones have been chosen, the order in which the selected zones are moved may also be determined. FIG. 8 illustrates this process. In particular, the first column shown in FIG. 8 displays the zones that are to be moved in logical order. In some systems, it is unlikely that this is the order of placement of data on disks, due to the presence of map-based features such as thin provisioning and snapshots. The placement of data on the physical media may actually be substantially different, as illustrated in the second column of FIG. 8. In such an environment, it is preferable to move zones in their physical order, so as to minimize the sweep of the disks involved in each node. This improves read performance from the old nodes, and further reduces the burden imposed on them due to migration.

Other more efficient orders of movement may also be chosen. For instance, in the third column of FIG. 8 is shown the time of last access of each zone in an illustrative system. The re-striping algorithm provided herein may move the data in the order of most-recently accessed data. If the application that is using the data follows a principle of locality of temporal reference, this is the data that is likely to be used again soonest. As a result, moving this data first will mean that the most recently used data is given a performance boost in terms of an additional node before old data is. For recently used data, the cluster appears like a four-node system much earlier than it does for stale data, thereby conferring performance benefits at a much earlier point in time.

While these are the only two methods of ordering data that have been shown, other possibilities exist for making this choice. These possibilities include most-frequently-used data moving first; highest-tier storage moving first; OS metadata moving first, etc. The concept of providing the first acceleration to data that is likely to be used the most in the future, remains the same for all of these algorithms.

Figure 9:
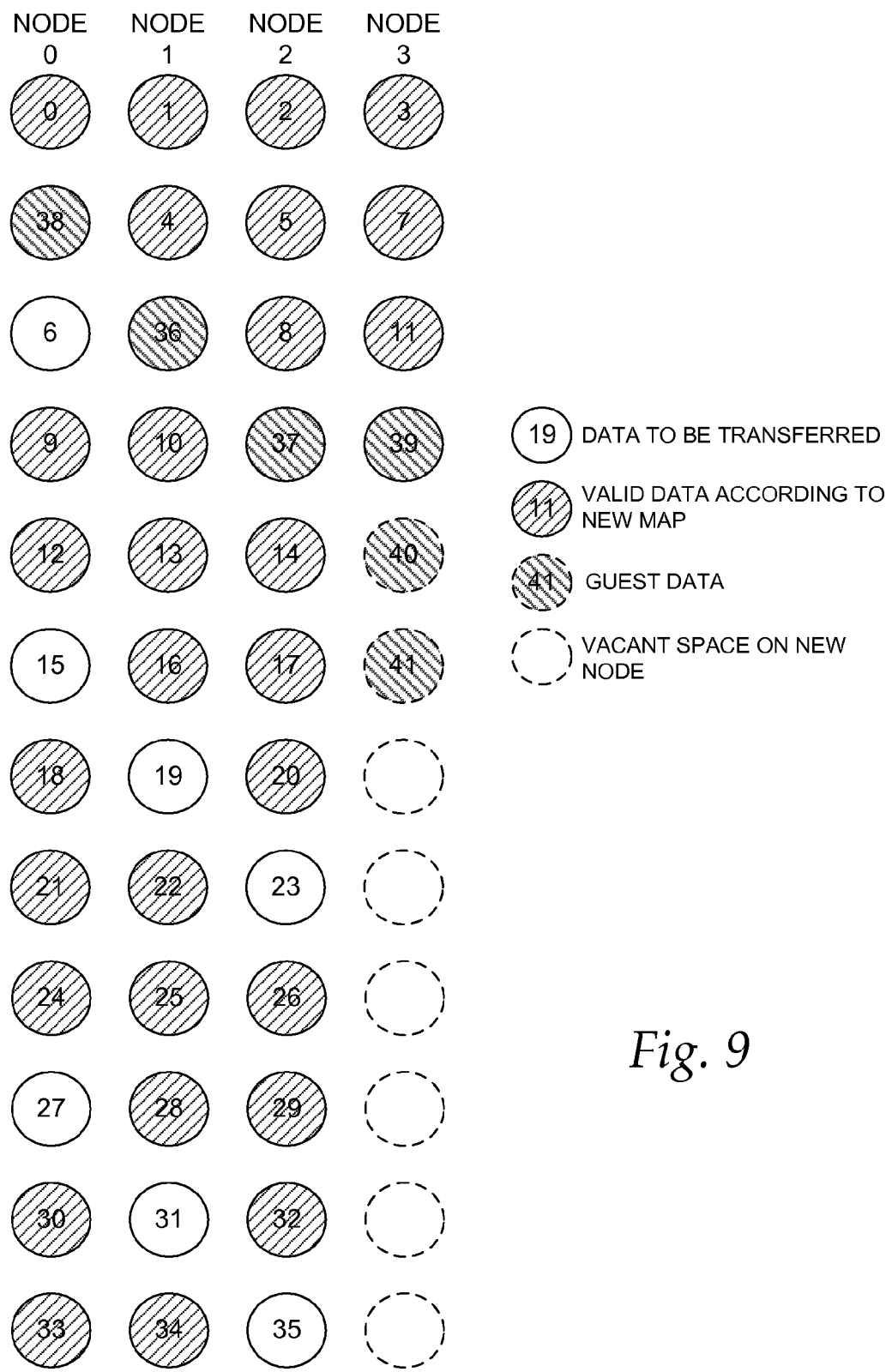
FIG. 9 is a data diagram that illustrates aspects of a method for moving data between nodes in which capacity may be made available immediately from the newly added node.

Turning now to FIG. 9, a further optimization will be described by which even more capacity can be made available as soon as possible. Since an administrator is likely to perform a capacity expansion only when there is a high demand for capacity, it is also likely that there will be substantial capacity utilization very soon after the new node has been added, and long before the expansion has been completed. It may be disastrous to return system failure due to lack of space in many applications. In such situations, the algorithms provided herein allow data to be temporarily hosted in the newly added node even if it does not belong there eventually, in the form of "guest" data. This data is stored in zones that will be occupied later by migrating data. For example, in FIG. 9, zone 40 is stored temporarily in the location that zone 15 will migrate to. When it is time to migrate data in these zones, a swap is performed, with the guest data moving to its correct location or to another guest zone. The swaps between the new node and the nodes where the guest data is to be hosted eventually may be performed at a higher priority than normal migration I/O operations.

The choice of maps shown in the figures so far is purely illustrative. It will be appreciated by those well-versed in the art that almost an infinite number of such maps exist. These maps need not conform to any particular mathematical formula; instead, they may be stored as tables in the main memory of the computer systems involved, and a lookup may be performed to identify the destination of any particular I/O. The number of entries that need to be stored in the maps is equal to the number of entries after which the map will repeat. This number may be equal to the least common multiple of all numbers from 1 to the maximum number of nodes supported.

Figure 10A:
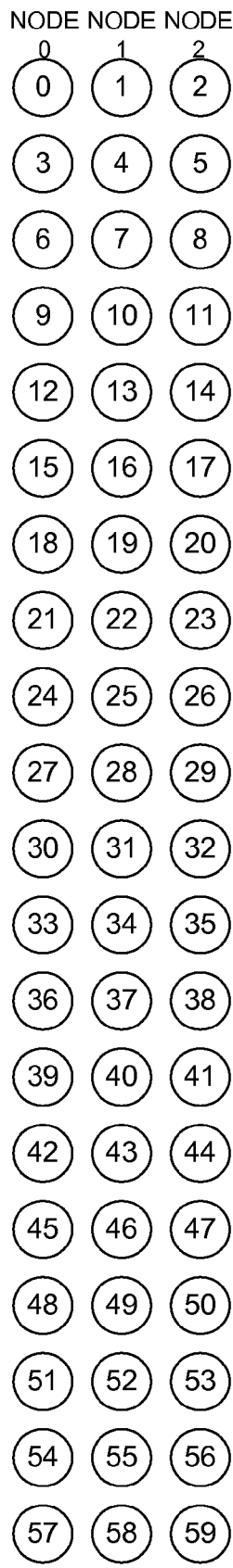
FIGS. 10A-10D are data diagrams that illustrate the layout of data on storage clusters having between three and six nodes, respectively.
Figure 10B:
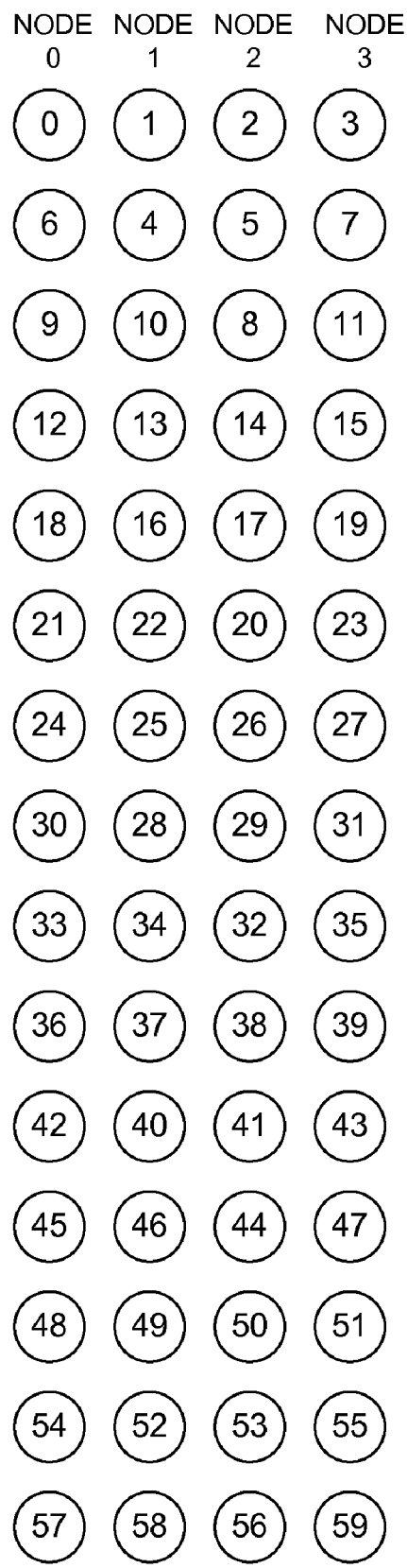
Figure 10C:
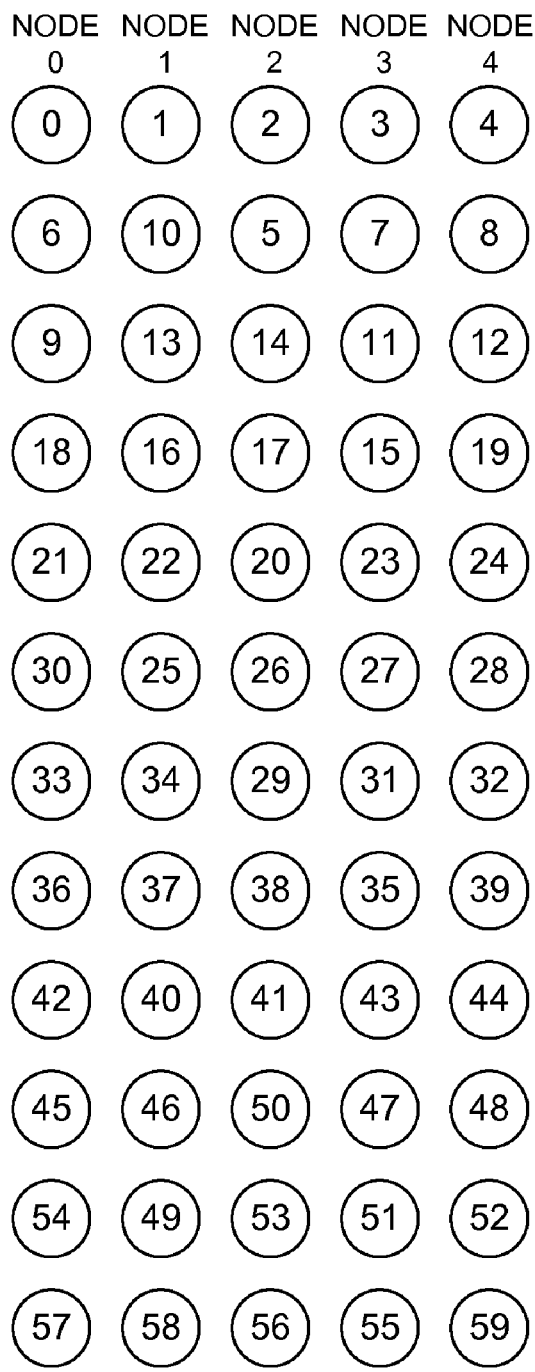
Figure 10D:
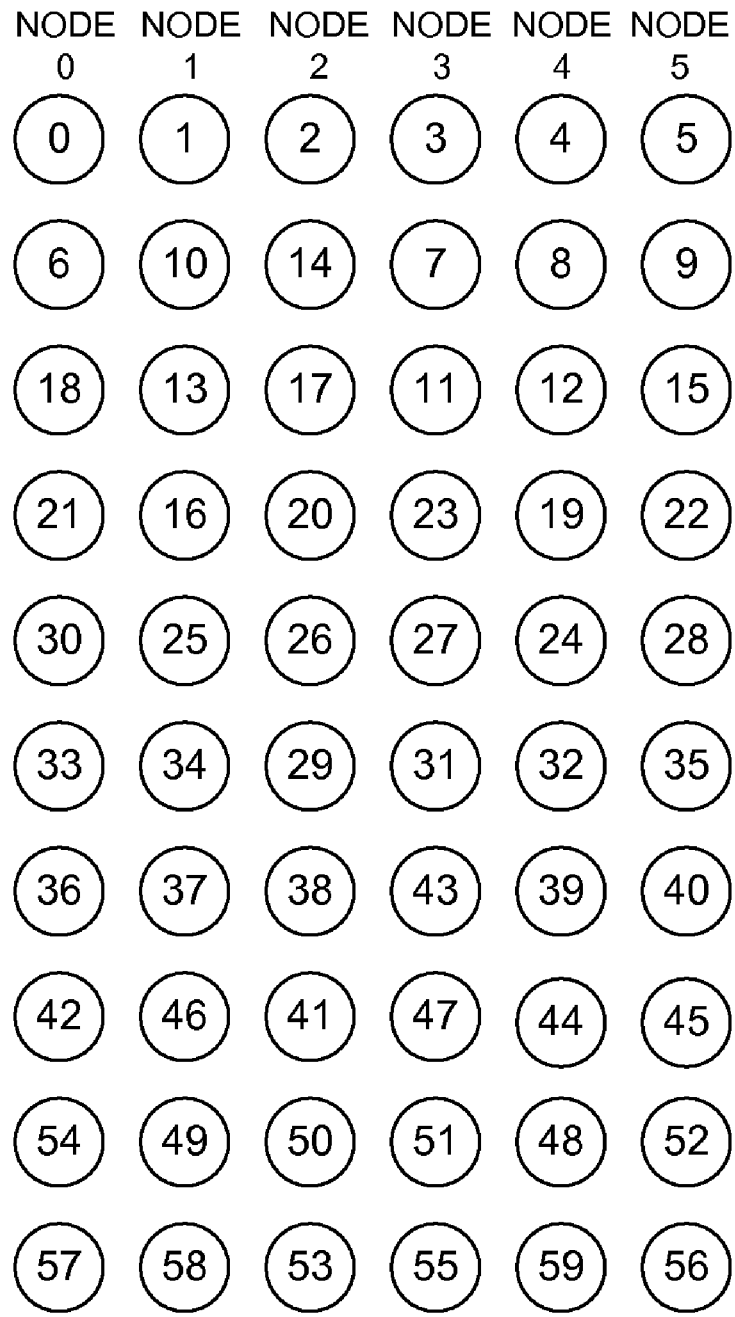

As an illustration, FIGS. 10A-10D shows the maps for 60 nodes for a cluster having between three and six nodes, which will support migration in a system comprising of anywhere between 1 node to 6 nodes. In particular, FIG. 10A shows one map for a cluster having three nodes, FIG. 10B shows a map for a cluster having four nodes, FIG. 10C shows a map for a cluster having five nodes, and FIG. 10D shows a map for a cluster having six nodes. Each of the maps shown in the FIGS. 10A-10D satisfies the properties described above.

In order to find the node in which a particular LBA resides, the LBA's zone must first be calculated by dividing it by the zone size. Next, the map multiple must be calculated by dividing the zone number by 60. The zone offset is the remainder of this division. The zone offset, which is guaranteed to be a number between 0 and 59, may be looked up in the corresponding map, and its node identified. This will be the node where the I/O operation is to be directed to. It should also be appreciated that the maps need not be stored statically in the computer systems involved. Instead, the maps may be generated dynamically.

Figure 11:
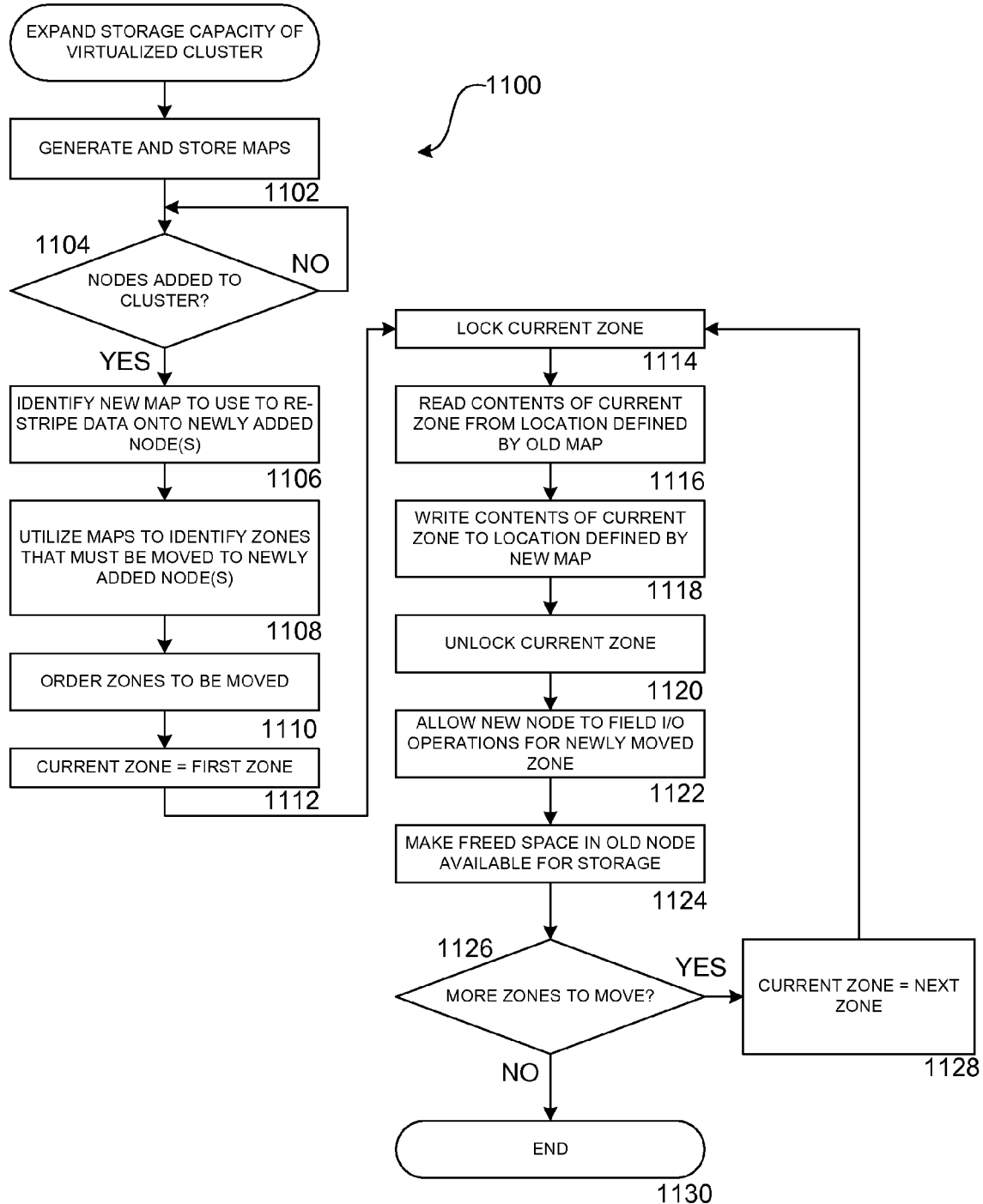
FIG. 11 is a flow diagram showing aspects of an illustrative method for expanding the capacity of a storage cluster.

Referring now to FIG. 11, an illustrative routine 1100 will be described for expanding the storage capacity of a storage cluster having two or more nodes. It should be appreciated that the logical operations of the various embodiments presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the embodiments described herein. Accordingly, the logical operations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 1100 begins at operation 1102, where the maps that define the striping patterns for the various configurations of a cluster, such as those shown in FIGS. 10A-10D, are generated and stored. Once the maps have been generated, the routine 1100 continues to operation 1104, where a determination is made as to whether nodes have been added to the cluster. If nodes have been added, the routine 1100 continues from operation 1104 to operation 1106.

At operation 1106, the appropriate map for use with the configuration of the cluster after the new node or nodes has been added is identified. As discussed above, the map is identified based on the number of nodes in the cluster after expansion. Once the appropriate map has been identified, the routine 1100 continues to operation 1108, where the new map and the map that was utilized to stripe the cluster prior to expansion are utilized to identify the zones that must be moved to the newly added nodes. Once the zones to be moved have been identified, the routine 1100 continues to operation 1110, where the identified zones are ordered for movement. As discussed above, the order of movement may be based upon the logical order of the zones, the physical order of the zones, or the order in which the zones were last accessed. Other factors may also be utilized to determine the order in which the zones are moved.

From 1110, the routine 1100 continues to operation 1112 where the value of a variable for storing the current zone is set equal to the first zone in the list of zones to be moved. From operation 1112, the routine 1100 continues to operation 1114, where the current zone is locked. As discussed above, it is only necessary to lock one zone at a time. Once the zone has been locked, the routine 1100 continues to operation 1116, where the contents of the current zone are read from the location defined by the old map. Once the data has been read, the routine 1100 continues to operation 1118, where the data is written to the zone defined by the new map. Once the data has been written, the current zone is unlocked at operation 1120. Moreover, at operation 1122, the new node is permitted to immediately begin fielding I/O operations for the newly moved zone.

From operation 1122, the routine 1100 continues to operation 1124, where the space freed as a result of the movement of the current zone is made available for storage. From operation 1124, the routine 1100 then continues to operation 1126, where a determination is made as to whether additional zones remain to be moved. If so, the routine 1100 branches from operation 1126 to operation 1128, where the current zone is set equal to the next zone to be moved. From operation 1128, the routine 1100 branches back to operation 1114, described above. If no additional zones remain to be moved, the routine 1100 continues from operation 1126 to operation 1130, where processing ends.

Although the embodiments presented herein have been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for expanding the data storage capacity of a storage cluster having two or more storage nodes, the method comprising:
    storing two or more maps, each map defining a stripe pattern for storing data on the storage nodes;
    striping data across the storage nodes of the cluster according to a first map;
    in response to the addition of a new storage node to the cluster, re-striping the data across the storage nodes according to a second map,
    wherein the stripe pattern for each map is defined such that when the storage cluster is striped according to the first map and the new storage node is added to the cluster, data is re-striped between the storage nodes according to the second map such that only the data that will subsequently reside in the new storage node is moved to the new storage node during re-striping,
    wherein the stripe pattern for each map is further defined such that when the new storage node is added to the cluster and the cluster is re-striped according to the second map, no movement of data occurs between two storage nodes that existed in the storage cluster prior to the addition of the new storage node,
    wherein the stripe pattern for each map is further defined such that when the new storage node is added to the cluster and the cluster is re-striped according to the second map, an equal amount of data is moved to the new storage node from each of the storage nodes that existed in the storage cluster prior to the addition of the new storage node,
    wherein data on the storage nodes is divided into storage zones, and wherein re-striping the data across the storage nodes according to a second map comprises
        identifying one or more storage zones to be moved to the new storage node based on the first and second maps, and
        individually moving each of the identified storage zones to the new storage node; and
    locking each storage zone individually while each storage zone is moved to the new storage node.

2. The method of claim 1, wherein each of the identified storage zones are moved to the new storage node in physical order.

3. The method of claim 1, wherein each of the identified storage zones are moved to the new storage node in the order that the identified storage zones were most recently accessed.

4. The method of claim 1, further comprising making each storage zone available for access on the new storage node immediately after each storage zone has been moved to the new storage node.

5. The method of claim 4, further comprising freeing and making available for data storage the space previously occupied by a storage zone immediately after a storage zone has been moved to the new storage node.

6. The method of claim 4, further comprising:
    receiving a data write including data intended for one of the storage nodes that existed in the storage cluster prior to the addition of the new storage node;
    storing the data for the data write on the new storage node; and
    subsequently moving the stored data from the new storage node to its intended location on the storage node that existed in the storage cluster prior to the addition of the new storage node.

7. A computer storage medium having computer-executable instructions stored thereon which, when executed by a computer, cause the computer to:
    store two or more maps, each map defining a stripe pattern for storing data on two or more storage nodes, wherein the stripe pattern for each map is defined such that when a storage cluster is striped according to a first map and a new storage node is added to the cluster, data is re-striped between the storage nodes according to a second map such that only the data that will subsequently reside in the new storage node is moved to the new storage node during re-striping,
    wherein the stripe pattern for each map is further defined such that when the new storage node is added to the cluster and the cluster is re-striped according to the second map, no movement of data occurs between two storage nodes that existed in the storage cluster prior to the addition of the new storage node, wherein the stripe pattern for each map is further defined such that when the new storage node is added to the cluster and the cluster is re-striped according to the second map, no movement of data occurs between two storage nodes that existed in the storage cluster prior to the addition of the new storage node;

stripe data across the storage nodes of the cluster according to the first map;

in response to the addition of a new storage node to the cluster, to re-stripe the data across the storage nodes according to the second map, wherein data on the storage nodes is divided into zones and wherein re-striping the data across the storage nodes according to the second map comprises identifying one or more zones to be moved to the new storage node based on the first and second maps, and individually moving each of the identified zones to the new storage node; and lock each zone individually while each zone is moved to the new storage node.

8. The computer storage medium of claim 7, wherein individually moving each of the identified zones to the new storage node comprises moving each of the identified zones to the new storage node in the order that the identified zones were most recently accessed.

9. The computer storage medium of claim 8, comprising further computer-executable instructions which, when executed by the computer, cause the computer to make each zone available for access on the new storage node immediately after each zone has been moved to the new storage node.

* * * * *